A. PINKOS.
FRUIT GATHERER.
APPLICATION FILED MAY 22, 1917.

1,258,455.

Patented Mar. 5, 1918.

WITNESSES

INVENTOR
A. Pinkios,
BY Victor J. Evans
ATTORNEY

UNITED STATES PATENT OFFICE.

ADAM PINKOS, OF TULSA, OKLAHOMA.

FRUIT-GATHERER.

1,258,455.    Specification of Letters Patent.    Patented Mar. 5, 1918.

Application filed May 22, 1917. Serial No. 170,311.

*To all whom it may concern:*

Be it known that I, ADAM PINKOS, a citizen of the United States, residing at Tulsa, in the county of Tulsa and State of Oklahoma, have invented new and useful Improvements in Fruit-Gatherers, of which the following is a specification.

This invention relates to fruit gatherers and it consists in the novel features hereinafter described and claimed.

An object of the invention is to provide a fruit gatherer of simple structure intended to be used for removing fruit from the branches of a tree and for collecting the same by gravity in a receptacle provided for its reception.

With this object in view the gatherer comprises a handle staff having a blade fixed at the upper end thereof. A blade is pivotally connected with the fixed blade and is actuated by a spring to normally hold the same in an open position with relation to the fixed blade. A flexible element is connected with the pivoted blade and is adapted to be used for swinging the same with relation to the fixed blade whereby the stems of the fruit may be severed. A hood or shield is positioned over the said spring and the end portion of the pivoted blade. A receptacle is carried by the fixed blade and is adapted to receive the fruit which is cut by the pivoted blade when the same is swung.

In the accompanying drawing:—

Figure 1:
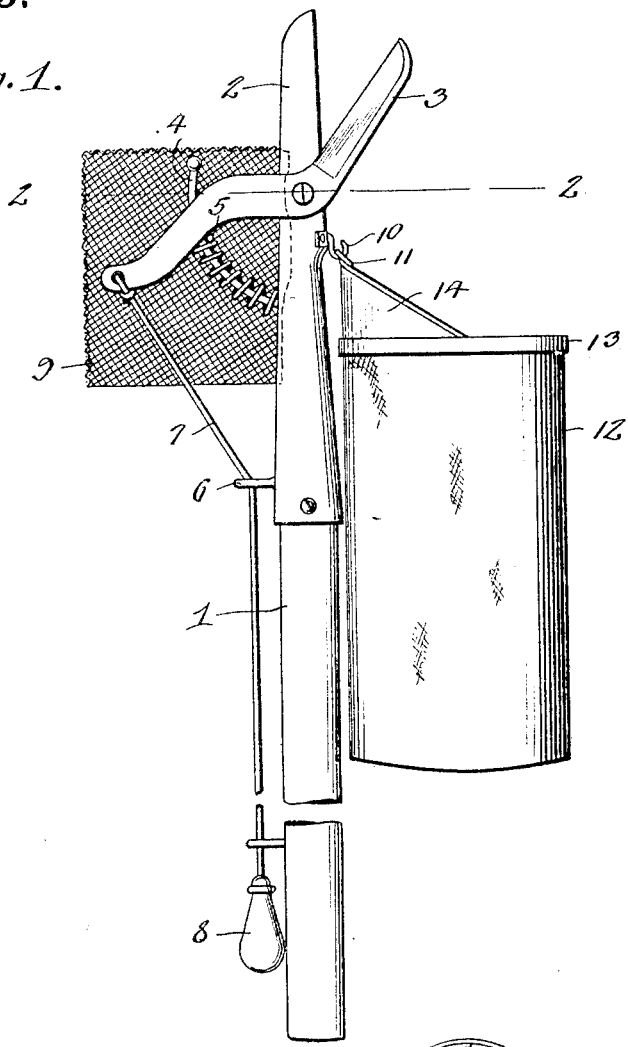
Figure 1 is a side elevation of the fruit gatherer.
Figure 2:
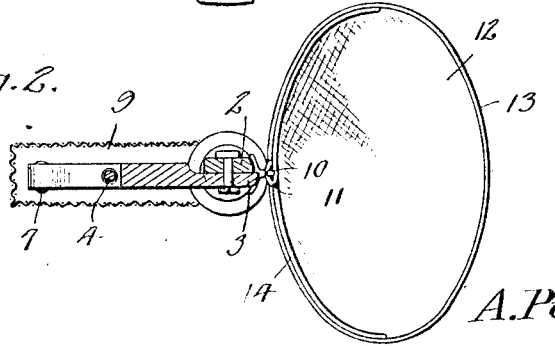
Fig. 2 is a sectional view of the same cut on the line 2—2 of Fig. 1.

The fruit gatherer comprises a handle staff 1 which is preferably made from wood. A blade 2 is fixed to the upper end of the staff 1 and the cutting edge of the said blade is approximately parallel with the axis of the said staff. A blade 3 is pivoted to the side of the blade 1 and is provided with a cutting edge adapted to coöperate with the cutting edges of the blade 1 in a manner similar to the cutting edges of scissors or shears. A curved rod 4 is attached to the blade 2 and passes transversely through the shank of the blade 3. A spring 5 is coiled around the intermediate portion of the rod 4 and bears at one end against the edge of the blade 2 and at the other end against the edge of the shank of the blade 3. The said spring 5 is under tension with a tendency to hold the blade 3 in an open position with relation to the blade 1. An eye 6 is mounted at the base portion of the blade 2 and a cord or other flexible element 7 is trained through the said eye 6. The cord 7 is attached at its upper end to the end of the shank of the blade 3 and the said cord carries at its lower end a suitable knob 8. A hood 9 of wire netting or other suitable material preferably of foraminous material is connected with the blade 2 and is located over the rod 4, spring 5 and the shank of the blade 3, and is adapted to protect these parts from the branches or limbs of the tree when the gatherer is in operation.

A hook 10 is mounted upon the blade 2 at a point below the blade 3 and is adapted to enter the eye 11 of a bag 12 whereby the said bag is suspended with relation to the blade 2 and below the cutting edges of the blades 2 and 3. The bag 12 is preferably of canvas and is provided with a metallic band 13 whereby the upper end or mouth of the bag is normally retained in an open position. A section 14 extends upwardly from the band 13 and is connected with the eye 11 and serves as means for directing the fruit which is cut by the blades into the bag 12.

In operation, the blades 2 and 3 are passed upwardly between the branches of a tree and the stem of the fruit is received between the cutting edges of the said blades. The operator then exerts a pull upon the cord 7 whereby the blade 3 is swung with relation to the blade 2 and the fruit is severed from the branch of the tree at its stem and the fruit falls into the bag 12.

From the foregoing description taken in conjunction with the accompanying drawing, it will be seen that a fruit gatherer of simple and durable structure is provided and that the same may be conveniently used for collecting fruit from the branches of trees in orchards or other places.

Having described the invention what is claimed is:—

A gatherer comprising a blade fixed to a staff, a blade pivoted to the fixed blade, a spring for normally holding the pivoted blade in an open position with relation to the fixed blade, means for holding the spring in position between the blades, a hood mounted on the fixed blade and extending over the spring and shank of the pivoted blade, said hood being continuous from side to side at its upper and rear edges and closed at its forward edge by the fixed blade to which it is attached and open at its lower edge and means passing through the lower open edge of the hood and attached to the pivoted blade for swinging the same.

In testimony whereof I affix my signature.

ADAM PINKOS.

Copies of this patent may be obtained for five cents each, by addressing the "Commissioner of Patents, Washington, D. C."